Sept. 25, 1951  C. E. ADAMS  2,569,213
HYDRAULIC MOTOR CONTROL APPARATUS
Filed March 12, 1947  2 Sheets-Sheet 1
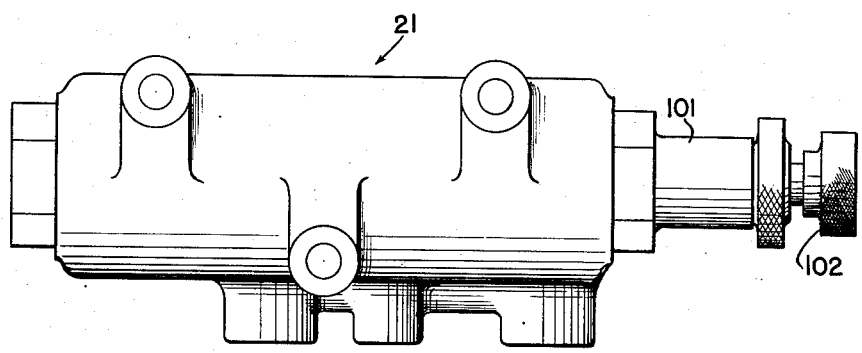
FIG. 1
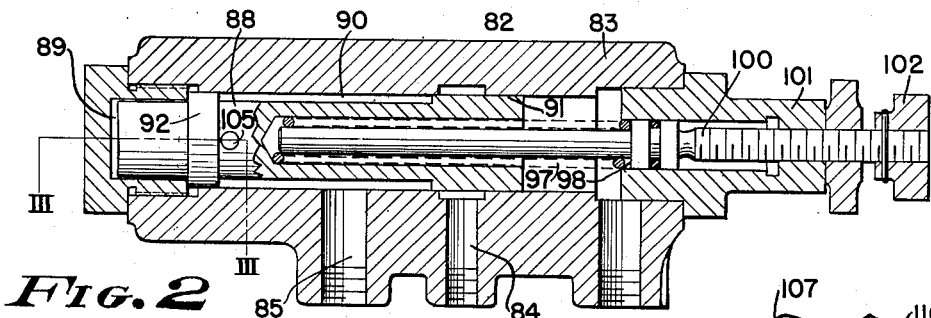
FIG. 2
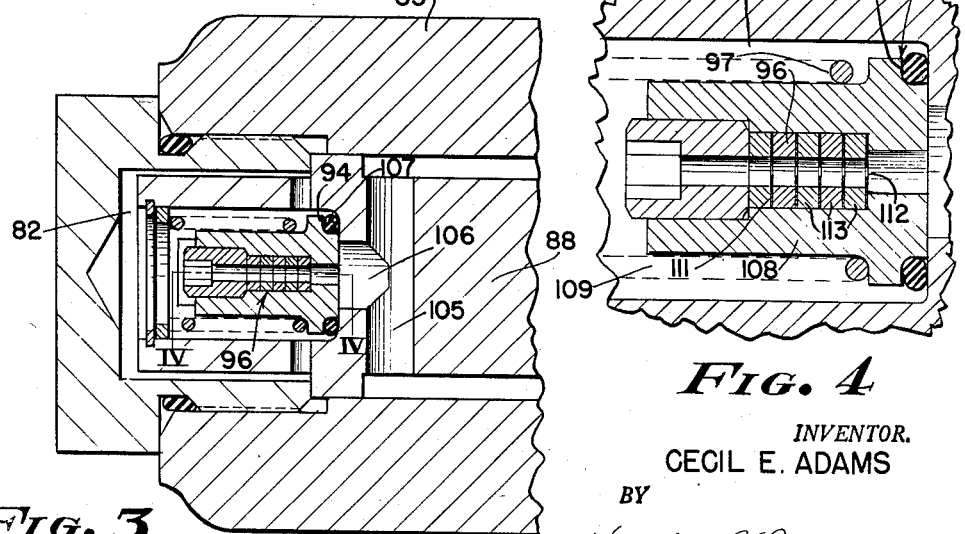
FIG. 3
FIG. 4
INVENTOR.
CECIL E. ADAMS
BY
Herschel C. Omohundro
attorney

Patented Sept. 25, 1951

2,569,213

UNITED STATES PATENT OFFICE 2,569,213

HYDRAULIC MOTOR CONTROL APPARATUS

Cecil E. Adams, Columbus, Ohio, assignor to The Denison Engineering Company, Columbus, Ohio, a corporation of Ohio Application March 12, 1947, Serial No. 734,127

13 Claims. (Cl. 121—38)

This invention relates generally to the science of hydraulics and is particularly directed to a hydraulic circuit and hydraulic apparatus contained within the hydraulic circuit.

One of the objects of the invention is to provide a hydraulic circuit for hydraulic apparatus of the type having a movable element, the circuit including means for causing delayed action of the movable element in the apparatus.

Another object of the invention is to provide a time-delay valve for use in a hydraulic circuit containing a power cylinder, the latter having a piston for reciprocatory movement in the cylinder, the time-delay valve being operative to cause the piston to remain in a certain position for a predetermined period of time before completing a desired cycle of movement.

Another object of the invention is to provide a time-delay mechanism for use in a hydraulic circuit, the time-delay mechanism being operated principally by hydrostatic pressure.

A still further object of the invention is to provide a time-delay mechanism of the type mentioned in the preceding paragraphs with means for varying the length of the delay caused by such mechanism.

Another object of the invention is to provide a hydraulic circuit with a time-delay mechanism which is fully automatic in operation, thus eliminating any additional requirements for action on the part of the operator of the mechanism in which the hydraulic circuit is incorporated.

Still another object of the invention is to provide a hydraulic circuit including a source of fluid pressure and a power unit with a control mechanism including a fluid pressure responsive valve which is operative to effect automatic forward and reverse action of the power unit and providing the circuit with a time-delay mechanism for causing the power unit to be retarded in its transition from forward to reverse operation.

Another object is to provide a time-delay mechanism of the type mentioned in the preceding paragraph which is set for operation by a pressure drop in the system and becomes operative when the pressure drop is diminished.

Still another object of the invention is to provide a time-delay mechanism for use in a hydraulic circuit, the mechanism having a spool valve biased by a spring toward a closed position and opened in opposition to the spring by fluid pressure when certain action takes place in the hydraulic system, the spool valve being closed by the spring when the above-mentioned condition changes, the movement of the spool valve to the closed position being retarded by a slow dissipation of fluid from the space in front of the spool valve.

An object of the invention also is to provide a hydraulic press having a hydraulic circuit including a source of fluid pressure, a power cylinder for operating the ram of the press, a valve mechanism for controlling the operation of the power cylinder, this mechanism having an automatic reversing valve moved in one direction by fluid pressure, and a time-delay mechanism for applying fluid pressure to the reversing valve to maintain the same in a position to direct fluid pressure from the source to a certain portion of the power unit; the time-delay mechanism includes a spool valve which is biased toward a closed position by a spring and toward an open position in opposition to the spring by a pressure differential existing when fluid is directed from the pressure source to the power cylinder to cause movement of the ram in one direction, the spring serving to return the spool valve to a closed position when the pressure differential is diminished by the interruption of ram movement, the time-delay mechanism including an orifice through which fluid is displaced by the spool in moving toward a closed position, the resistance caused by the orifice retarding the movement of the spool to delay the closing of the valve, this delay serving to lengthen the period of time fluid pressure is applied to the reversing valve and consequently the time period during which the ram exerts pressure on the work prior to making a return stroke.

An object also is to provide a time-delay mechanism of the type mentioned in the preceding paragraph with a fixed orifice and means for changing the potential travel of the spool to vary the length of the delay caused by the mechanism.

It is an object of the invention to provide a hydraulic circuit for a hydraulic mechanism of the type having a cylinder with a reciprocatory piston and a control mechanism for governing the operation of the piston, the control mechanism having a reversing valve which is maintained in a position to cause movement of the piston in a selected direction through the utilization of fluid discharged from the cylinder while the piston is moving in such direction, the cessation of fluid discharge, due to the interruption of movement of the piston, permitting the reversing valve to shift to a position to cause reverse movement of the piston, the circuit being provided with a mechanism for delaying the shifting of the reversing valve for a predetermined time after the piston stops moving, the time-delay mechanism being automatically set for operation when the piston moves in the selected direction and released for operation when the piston stops moving in such direction.

Another object is to provide a time-delay mechanism for a hydraulic circuit, which mechanism is provided with a flow resisting element consisting of a group of reduced orifices spaced in a series whereby the effect of a single minute orifice may be secured without the danger of stoppage attendant thereto, the use of a group of larger orifices also permitting the employment of substantial material and still maintain the ratio of diameter to length of orifice most conducive to a minimization of the effect of changes in viscosity of the hydraulic fluid due to temperature variations.

Further objects and advantages of the present invention will be apparent from the following description, reference being had to the accompanying drawings wherein a preferred form of embodiment of the invention is clearly shown.

In the drawings:

Fig. 1 is a plan view of the time-delay valve formed in accordance with the present invention.

Fig. 2 is a detail horizontal sectional view taken through the valve shown in Fig. 1.

Fig. 3 is a detail sectional view taken through a portion of the valve on the plane indicated by the line III—III of Fig. 2.

Fig. 4 is a similar view on an enlarged scale taken through a portion of the valve on the plane indicated by the line IV—IV of Fig. 3.

Figure 5:
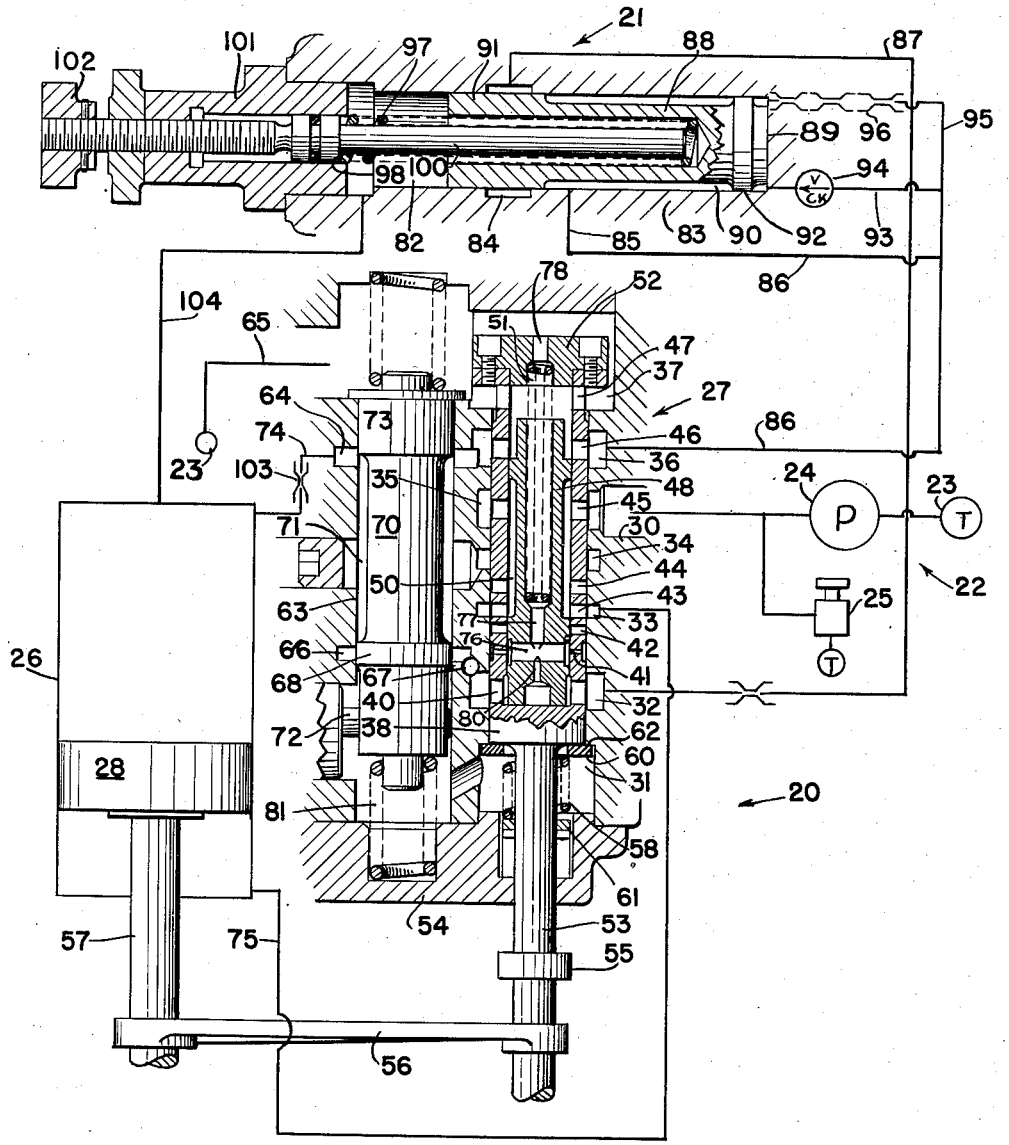
Fig. 5 is a diagrammatic view of a hydraulic system for a hydraulic power cylinder, the time-delay mechanism shown in Figs. 1 to 4 being incorporated therein.

Referring more particularly to the drawings and especially to Fig. 5 thereof, the numeral 20 designates a hydraulic system in which the time-delay valve, indicated generally by the numeral 21, is connected. The circuit 20 includes a source of fluid pressure 22 having a fluid reservoir 23, a motor-driven pump 24 and a relief valve 25 for limiting the pressure generated by the pump 24. The circuit also includes a power cylinder 26 and a control valve mechanism 27 for governing the movement of a piston 28 contained within the power cylinder. The mechanism 27 may be of any suitable type, that illustrated corresponding to a control valve mechanism forming the subject matter of my copending application Serial No. 589,163, filed April 19, 1945, now Patent No. 2,491,355, granted December 13, 1949. This valve mechanism includes a body 30 having a bore 31 and a plurality of annular grooves 32 to 37, inclusive, spaced longitudinally of the bore 31. This bore 31 receives for sliding movement a sleeve member 38 which is provided with a plurality of sets, 40 to 47 inclusive, of laterally extending ports which sets of ports are spaced longitudinally of the sleeve, these ports registering in certain positions of movement of the sleeve, with certain of the grooves 32 to 37. The sleeve receives a shuttle valve spool 48 which is provided with an external groove 50 for connecting certain sets of ports in different positions of longitudinal movement in the sleeve. This spool is biased toward the lower end of the sleeve by a coil spring 51 disposed between the spool and a cap 52 secured to the upper end of the sleeve.

A shipper rod 53 projects from the lower end of the sleeve 38 through a cover 54 which is secured to the bottom of the body 30. This shipper rod receives a collar 55 for engagement by an arm 56 which is carried by a ram 57 projecting from the under side of piston 28. When the arm 56 engages collar 55 movement will be transmitted to the shipper rod 53 and sleeve 38; this movement takes place only when the piston 28 is moving in an upward direction adjacent the termination of its upward stroke. Normally, the sleeve 38 is held in a centered position by a coil spring 58 surrounding the shipper rod and engaging a washer 60 at its upper end and a stop collar 61 at its lower end. The washer 60 is arranged to engage a shoulder 62 which surrounds the lower end of bore 58, this shoulder serving to limit the upward movement of the washer. Collar 61 engages the bottom wall of a counterbored hole through which the shipper rod 53 projects; this arrangement permits movement of the sleeve in either direction in opposition to the force of the spring 58. When the sleeve 38 is moved upwardly by the final stage of upward movement of the piston 28, ports 44 will be in registration with groove 34 so that fluid flowing from the pressure source to groove 35 will be conducted through the interior of the sleeve 38 and ports 44 to groove 34 from which it may flow through a second bore 63 to a groove 64 which communicates with groove 36 and from groove 36 through ports 46, the interior of the sleeve 38 above spool 48 and outwardly therefrom through ports 47 to groove 37 from which the fluid will flow through the upper end of bore 63 and through conduit 65 to reservoir 23. When the fluid follows this path pump 24 will operate under no load.

The body 30 is also provided with an annular groove 66 in communication with bore 63 below the point of communication of such bore with groove 34. Groove 66 communicates with groove 32 as at 67, communication between bore 63 and groove 32 over this path being normally precluded by a land 68 formed on a spool 70 disposed for longitudinal adjustment in bore 63. Spool 70 has an external groove 71 above land 68, this groove normally providing for fluid flow from groove 34 to groove 64. When it is desired to initiate an operation of the power cylinder, spool 70 is lowered through the actuation of a crank pin 72 until a land 73, at the upper end of spool 70 blocks groove 64, at which time groove 71 will establish communication between groove 34 and groove 66. With spool 70 so positioned fluid flowing from the pressure source into groove 35 will pass through ports 45 to the interior of the sleeve 38 and outwardly therefrom through ports 44 to groove 34; this fluid then flows into bore 63 and downwardly to groove 66 from which it will flow to groove 32.

The fluid enters the sleeve 38 through ports 40 and exerts an upward force on the shuttle valve spool 48. This force moves the shuttle valve in opposition to the spring 51 to cause groove 50 to establish communication between ports 45 and 46. At this time fluid introduced to groove 35 from the source of fluid pressure will flow through ports 45 to the interior of the sleeve 38 and outwardly therefrom through ports 46 to groove 36. This fluid will then flow through passage 74 to the upper end of power cylinder 26; the force of this fluid will act upon piston 28 to urge it in a downward direction. This movement of the piston discharges fluid from the lower end of the power cylinder through line 75 to groove 33. Such fluid will then flow through ports 42 into a transverse passage 76 formed in the shuttle valve spool 48. From this passage fluid will be discharged through an axial passage 77 in the shuttle valve and an extension 78 thereof in cap 52 to the groove 37 from which it will flow to the reservoir 23. Due to the restriction of port 77 a back pressure will be built up in passage 76, port 42, groove 33, and line 75, as well as in the bottom portion of power cylinder 26. This back pressure will be transmitted through a reduced passage 80 in the lower portion of the shuttle valve to the lower end of the chamber in sleeve 38 beneath the shuttle valve, this pressure tending to retain the shuttle valve in an elevated position during downward movement of the piston 28.

Under normal conditions the back pressure will fall when piston 28 ceases to move in a downward direction for any reason, and when this occurs spring 51 will return the shuttle valve to a lowered position in which fluid pressure from the pump 24 will be directed to the under side of the piston 28 while the upper end of the power cylinder will be in communication with the reservoir 23. At this time the force of the fluid will move the piston 28 and ram 57 in an upward direction in the return stroke of the ram. When the ram and piston approach the upper limit of this return stroke, arm 56 will engage collar 55 on the shipper rod 53 and move spool 38 upwardly until ports 44 again register with groove 34 at which time fluid pressure from the source will be directed to the reservoir 23. It will be understood at this time that in the initial portion of the downward stroke of piston 28 arm 56 moves away from collar 55 permitting spring 58 to return sleeve 38 to its normal position in which ports 44 are not in registration with groove 34. After this initial movement spool 70 may be returned to its normal position either through the manual actuation of crank pin 72 or automatically under the influence of spring 81 disposed between lower end of the spool 70 and the bottom cover 54.

As set forth in the above-mentioned copending application crank pin 72 may be employed to set spool 70 for the automatic operation of the power cylinder; that is, spool 70 will be retained in its lowered position in which groove 63 therein continuously establishes communication between groove 34 and groove 66. When spool 70 is so disposed the final stage of upward movement of piston 28 will cause the registration of ports 44 with groove 34 and fluid from the source of pressure may then flow directly to groove 32 to initiate another cycle of operation of the power cylinder. The mechanism and operation thus far described are identical with those of the copending application mentioned, the foregoing description having been given merely to facilitate the understanding of the present invention.

On some occasions in the use of the press mechanism above described, it is desirable in the operation of ram 57, to cause this ram to hesitate or dwell at the lower end of the downward or power stroke before the return stroke is initiated. One such occasion is found in the formation of belts for sanding machines wherein the ends of the belts are coated with adhesive and pressed together with the press ram, the overlapped ends being squeezed together for a predetermined time period to permit the adhesive to set. Another occasion is in the formation of die cast or certain plastic materials wherein the material is subjected to ram pressure while being heated or while in a fluid or plastic state. To effect this hesitation or dwell of the ram, a time-delay mechanism indicated by the numeral 21, has been disposed in the hydraulic circuit. This time-delay mechanism is so constructed and connected in the system that its operation will be accomplished hydraulically and fully automatically. The time-delay mechanism 21 includes a bore 82 in a body 83, which body is provided with a pair of ports 84 and 85 spaced longitudinally of the bore 82. Port 85 is connected by line 86 with groove 36 in body 30; port 84 is connected by line 87 with groove 32. Bore 82 slidably receives a spool 88 in which an annular groove 90 is provided, this spool also having a wide land 91 at one end which normally obstructs communication between ports 84 and 85. A narrower land 92 adjacent the opposite end of the spool prevents communication between the groove 90 and the end 89 of bore 82 adjacent the corresponding end of the spool. This end of bore 82 is connected by a line 93 with line 86, line 93 having a check valve 94 disposed therein; this check valve permits unrestricted fluid flow from line 86 into the end 89 of bore 82 and prevents fluid flow outwardly through line 93. A second line 95 also extends from this end of the bore 82 to line 86, line 95 having flow-restricting means 96 disposed therein; the purpose of this flow-restricting means will be set forth hereinafter.

The spool 88 is normally advanced toward a position to block communication between ports 84 and 85 by a coil spring 97 disposed between the end of a socket in the spool and a shoulder 98 on a stop screw 100, threadedly received in a cap 101 for body 83. Stop screw 100 has an exteriorly disposed knob 102 by means of which this screw is adjusted in or out to regulate the degree of movement of spool 88. In the innermost position thereof stop screw 100 retains spool 88 in position to prevent communication between ports 84 and 85 and renders the time-delay mechanism ineffective. By adjusting the screw outwardly a distance sufficient to permit spool 88 to move far enough so that groove 90 on the spool will establish communication between ports 84 and 85, the time-delay mechanism may be rendered operative. The degree of outward movement of the stop screw will determine the length of the time-delay period.

This time-delay mechanism operates in response to a pressure drop created in line 74 by a restricted orifice 103 disposed in such line. Due to the orifice 103 fluid flow to the power cylinder 26, when shuttle valve 48 is in elevated position, will be restricted. Fluid will, therefore, be caused to flow through lines 86 and 93 to the end of bore 82; this fluid will move spool 88 in opposition to spring 97 until the inner end of stop screw 100 is engaged by the inner end of the socket in the spool. Immediately after spool 88 starts to move in opposition to spring 97 groove 90 will establish communication between ports 84 and 85 and some of the fluid from the source of pressure will be directed through line 87 to groove 32 and the under side of the shuttle valve. As long as piston 28 is moving in a downward direction a pressure differential will exist on opposite sides of the orifice 103, the higher pressure of this pressure differential being applied through lines 86 and 93, as above described, to the end of the spool opposite the spring 97. The lower pressure is applied to the opposite end of the spool through line 104 which is connected with the upper end of the power cylinder 26. While this pressure differential exists, spool 88 will be held against the action of spring 97. After the piston and ram cease to move the pressure differential is dissipated causing equal pressures at opposite ends of the spool 88, thus permitting spring 97 to move spool 88 toward a closed position. Fluid pressure beneath the shuttle valve 48 will be maintained through lines 86 and 87 until spool 88 returns to a position to interrupt communication between ports 84 and 85. This movement of spool 88 is retarded by the restricting means 96 which opposes fluid flow from the end of the bore 82, this fluid flow being caused by movement of piston 88 under the influence of spring 97.

When spool 88 interrupts fluid flow from line 86 to line 87, pressure beneath shuttle valve 48 will be dissipated and spring 51 will return the shuttle valve to its lowered position wherein fluid pressure from the source will be directed into the lower end of the power cylinder; the return stroke of the piston and ram will then be effected.

It is important to note that in the operation of the power unit the shuttle valve 48 is retained in an elevated position or a position to cause movement of the piston in a working stroke, by the fluid being discharged from the power unit. In order to effect such a discharge, it is necessary that a flow of fluid from the pressure source to the power unit be maintained. While such flow is taking place, the pressure differential employed to cock or set the time-delay spool for operation serves also to hold the spool ready for action. The stopping of the piston 28 in any manner permits the instantaneous dissipation of the pressure differential which starts the operation of the time-delay. One feature of the mechanism shown and described is that the shuttle spool and the time-delay spool are held against movement by spring force indirectly by the movement of the same element, namely the piston 28. The initiation of the period of the delay is thus dependent upon the operation of the element to which the delaying action is applied. It will be observed that in varying the length of the time-delay caused by this mechanism the distance travelled by spool 88 is varied permitting more or less fluid to be directed into the end of bore 82 for discharge through the restricting means 96. In all positions of adustment of the time-delay mechanism the diameter of the orifices in the restricting means 96 remains the same.

Figs. 1 to 4, inclusive, disclose the actual construction of one form of the time-delay mechanism. It will be observed from Figs. 3 and 4 that the check valve 94 and flow-restricting means 96 are embodied in one piece of the valve, these elements being carried by and movable with the spool 88. This spool has a transversely extending passage 105, see Fig. 3, which communicates with a longitudinally extending passage 106; this passage terminates in a socket 107 formed in the spool 88. The socket receives a substantially cylindrical check valve body 108 which is urged by a spring 109 toward the inner end of the socket 107. Body 108 has a resilient gasket 110 provided on its inner end for engagement with the inner end of the socket 107. This gasket and the manner of mounting spool 108 for movement permits unrestricted fluid flow from bore 106 into socket 107 but prevents the reverse flow of fluid over this path. When spring 97 moves spool 88 toward a closed position fluid must flow from the end of the bore 82 through the flow restricting means 96 which is contained within the check valve body 108. This flow restricting means comprises a series of spaced wafers or disks 111 in which orifices 112 are provided. A series of wafers is employed to permit the use of larger orifices while the effect of a small or minute orifice is secured. The wafers are formed of thin material to reduce the deleterious effects of changes in the viscosity of the oil due to temperature variations.

The disks 111 are clamped between spacers 113 which comprise ring-like members positioned between adjacent disks. This arrangement provides a series of chambers separated by the disks 111 and communicating only through the orifices therein. Due to the alternate restrictions and chambers the fluid will be repeatedly accelerated and decelerated so that the force of the fluid will be continuously lessened until the effect of a minute orifice is secured.

It has been determined that by forming an orifice through which fluid is to flow, in a thin piece of material, the effect of the orifice on the flow will be affected less by changes in viscosity due to temperature variations than if the orifice is formed in thick material.

By using relatively large orifices the disks may be formed of heavier material while the most desirable ratio of orifice diameter to length is maintained. If a single minute orifice were employed and an attempt were made to retain the same diameter to length ratio, the material would be so thin that a failure thereof would immediately result.

I claim:

1. In a hydraulic system, a source of fluid pressure; a reversible fluid motor; control valve mechanism between said source and said motor; said mechanism having a reversing valve responsive to fluid pressure to direct fluid from said source to said motor to cause forward operation thereof; a second valve means responsive to a fluid pressure differential dependent upon forward operation of said motor to apply fluid pressure to said reversing valve; means operative upon the cessation of forward operation of said motor to actuate said valve means to discontinue the application of fluid pressure to said reversing valve; means for delaying the operation of said last-named means; and means for automatically shifting said reversing valve to a position to cause reverse operation of said motor when the application of fluid pressure to said reversing valve is discontinued.

2. In a hydraulic system, a source of fluid pressure; a reversible fluid motor; a control valve mechanism between said pressure source and said motor; a reversing valve forming a part of said control valve mechanism, said reversing valve being responsive to fluid pressure to move to a position to cause operation of said motor in one direction; means for automatically shifting said reversing valve to a second position to cause said motor to operate in the opposite direction when operation in the first direction is discontinued; and means for applying fluid pressure from said source to said reversing valve for a predetermined time period after said motor ceases operation in said one direction to temporarily retain the reversing valve in the first-mentioned position to delay the operation of said motor in the opposite direction.

3. In a hydraulic system, a source of fluid pressure; a reversible fluid motor; a control valve mechanism between said pressure source and said motor; a reversing valve in said control mechanism; means for applying fluid pressure from said source to said reversing valve to move the same to a position to effect forward operation of said motor; means operative upon the interruption of forward motor operation to shift said reversing valve to a position to cause reverse operation of said motor; and means for delaying the operation of said last-named means, said delaying means having a valve controlled passage for maintaining fluid pressure on said reversing valve to retain the same in position to cause forward motor operation.

4. In a hydraulic system, a source of fluid pressure; a reversible fluid motor; control valve mechanism between said fluid pressure source and said motor; a reversing valve in said mechanism, said valve being movable between positions to alternately direct fluid from said source to different parts of said motor to cause forward and reverse operation therof; means normally urging said reversing valve toward the position to direct fluid to said motor to cause reverse operation; means for applying fluid pressure to said reversing valve to move the same in opposition to said urging means to the position to direct fluid to said motor to cause forward operation thereof; and means rendered operative by fluid pressure when said reversing valve is moved to the position to cause forward motor operation, to continue the application of fluid pressure to said reversing valve for a predetermined period after forward operation of said motor is discontinued.

5. In a hydraulic system, a source of fluid pressure; a power unit having a cylinder and piston; control mechanism between said source and said cylinder, said control mechanism having an inlet communicating with said pressure source and first and second outlets communicating with opposite ends of said cylinder; a reversing valve for alternately connecting said first and second outlets with said pressure source; means for applying fluid pressure to said reversing valve to move the same to a first position to connect said inlet with said first outlet to cause fluid from said source to move said piston in one direction; means tending to move said reversing valve to a second position to connect said second outlet with said inlet when said piston ceases to move in said one direction; and means for delaying the operation of said last-named means, said delay means having a passage for applying fluid under pressure to said reversing valve to hold said reversing valve in said first position and a valve responsive to a pressure differential to provide for fluid flow through said passage.

6. In a hydraulic system, a source of fluid pressure; a power unit having a cylinder and a piston; a control mechanism having an inlet and a pair of outlets; a conduit between said source and said inlet; fluid conductors connecting said pair of outlets with opposite ends of said cylinder; a reversing valve in said control mechanism, said valve being responsive to fluid pressure to connect a predetermined outlet with said inlet; an orifice in the conductor connecting said predetermined outlet with said cylinder; a passage communicating with said predetermined outlet and leading to said valve, fluid flow from said predetermined outlet through said passage serving to apply pressure to said valve; and a normally closed time delay valve in said passage, said time delay valve being responsive to a pressure drop caused by said orifice to provide a flow through said passage from said predetermined outlet to said reversing valve.

7. In a hydraulic system, a source of fluid pressure; a power unit having a cylinder and a piston; a control mechanism having an inlet and a pair of outlets; a conduit between said source and said inlet; fluid conductors connecting said pair of outlets with opposite ends of said cylinder; a reversing valve in said control mechanism, said valve being responsive to fluid pressure to connect a predetermined outlet with said inlet; an orifice in the conductor connecting said predetermined outlet with said cylinder; a passage communicating with said predetermined outlet and leading to said valve, fluid flow from said predetermined outlet through said passage serving to apply pressure to said valve; a normally closed time delay valve in said passage, said time delay valve being moved to open position by a pressure differential caused by said orifice; and flow resisting means for retarding the closing of said time delay valve when said pressure differential is dissipated.

8. In a hydraulic circuit, a source of fluid pressure; a reversible fluid motor; control mechanism between said pressure source and said motor, said mechanism having a reversing valve; means normally urging said reversing valve toward a first position to cause operation of said motor in one direction; means for applying fluid pressure to said reversing valve to move the same to a second position to cause operation of said motor in the opposite direction; means for utilizing the exhaust flow from said motor while operating in the opposite direction to prevent said reversing valve from returning to said first position; and means for delaying the return of said reversing valve to said first position for a predetermined time period after said motor ceases to operate in said opposite direction, the operation of said delaying means being initiated by the interruption of fluid flow from said pressure source to said motor due to the stalling of said motor.

9. In a hydraulic circuit, a source of fluid pressure; a reversible fluid motor; control mechanism between said pressure source and said motor, said mechanism having a reversing valve; means normally urging said reversing valve toward a first position to cause operation of said motor in one direction; means for applying fluid pressure to said reversing valve to move the same to a second position to cause operation of said motor in the opposite direction; means responsive to fluid flow from said power source to said motor while operating in said opposite direction to apply fluid from said source to said reversing valve to restrain the same from returning to said first position; and means for prolonging the application of fluid to said reversing valve for a predetermined time period after fluid ceases to flow from said source to said motor.

10. In a hydraulic system, a source of fluid pressure; a reversible fluid motor; control means between said pressure source and said motor, said control having a reversing valve for causing alternate forward and reverse operation of said motor; fluid pressure operated means for delaying the change in direction of operation of said motor, said delay means having a body with a chamber; a valve spool disposed for movement in said chamber; and means for controlling the movement of said spool in one direction, said means having a passage with a series of chambers communicating through reduced orifices.

11. In a hydraulic system, a source of fluid pressure; a reversible fluid motor; control valve mechanism between said source and said motor, said mechanism having a reversing valve responsive to fluid pressure to direct fluid from said source to said motor to cause forward operation thereof; a second valve means responsive to a fluid pressure differential dependent upon forward operation of said motor to apply fluid pressure to said reversing valve; means operative when forward operation of said motor is interrupted to move said second valve means to a position to discontinue the application of fluid pressure to said reversing valve; fluid flow controlling means for regulating the rate of movement of said second valve to such position; and means for automatically shifting said reversing valve to a position to cause reverse operation of said motor when the application of fluid pressure to said reversing valve is discontinued.

12. In a hydraulic system, a source of fluid pressure; a reversible fluid motor; control valve mechanism between said source and said motor, said mechanism having a reversing valve responsive to fluid pressure to direct fluid from said source to said motor to cause forward operation thereof; a second valve means responsive to a fluid pressure differential dependent upon forward operation of said motor to apply fluid pressure to said reversing valve; means operative when forward operation of said motor is interrupted to move said second valve means to a position to discontinue the application of fluid pressure to said reversing valve; orifice means for regulating the rate of movement of said second valve to such position; and means for automatically shifting said reversing valve to a position to cause reverse operation of said motor when the application of fluid pressure to said reversing valve is discontinued.

13. In a hydraulic system, a source of fluid pressure; a reversible fluid motor; control valve mechanism between said source and said motor, said mechanism having a reversing valve responsive to fluid pressure to direct fluid from said source to said motor to cause forward operation thereof; a second valve means responsive to a fluid pressure differential dependent upon forward operation of said motor to apply fluid pressure to said reversing valve; means for varying the degree of response of said second valve means to fluid pressure; means operative when forward operation of said motor is interrupted to move said second valve means to a position to discontinue the application of fluid pressure to said reversing valve; fluid flow controlling means for regulating the rate of movement of said second valve to such position; and means for automatically shifting said reversing valve to a position to cause reverse operation of said motor when the application of fluid pressure to said reversing valve is discontinued.

CECIL E. ADAMS.

REFERENCES CITED

The following references are of record in the file of this patent:

UNITED STATES PATENTS

| Number | Name | Date |
|---|---|---|
| 1,893,076 | Flygare | Jan. 3, 1933 |
| 1,998,003 | Ernst | Apr. 16, 1935 |
| 2,000,805 | West | May 7, 1935 |
| 2,223,792 | Muir | Dec. 3, 1940 |
| 2,249,343 | Balsiger | July 15, 1941 |
| 2,290,832 | Flygare | July 21, 1942 |
| 2,397,103 | Haberstump | Mar. 26, 1946 |